No. 783,879. Patented February 28, 1905.

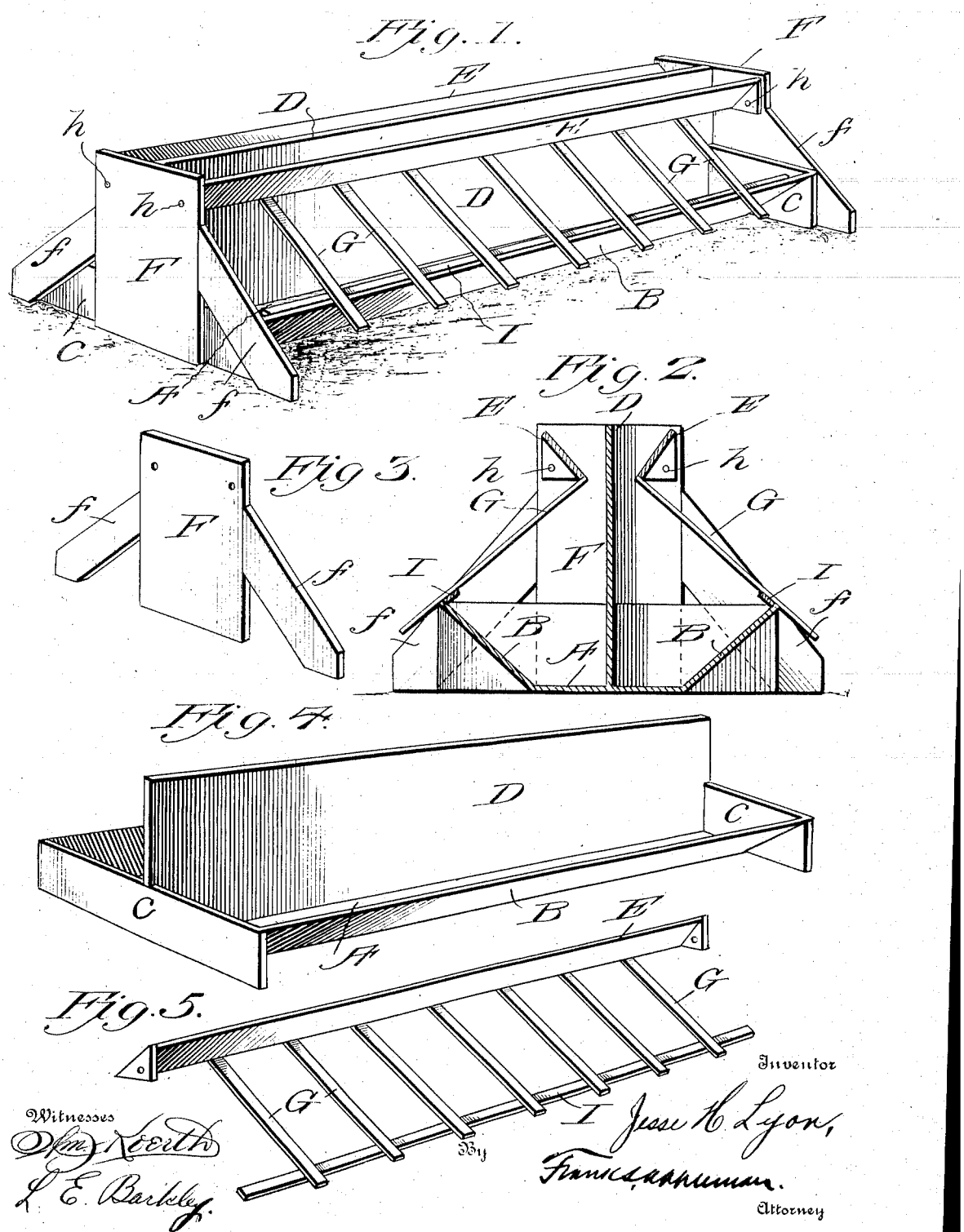

UNITED STATES PATENT OFFICE.

JESSE HUNT LYON, OF STURGEON, MISSOURI.

FEEDING OR WATERING TROUGH.

SPECIFICATION forming part of Letters Patent No. 783,879, dated February 28, 1905.

Application filed June 2, 1904. Serial No. 210,909.

*To all whom it may concern:*

Be it known that I, JESSE HUNT LYON, a citizen of the United States of America, residing at Sturgeon, in the county of Boone and State of Missouri, have invented certain new and useful Improvements in Feeding or Watering Troughs, of which the following is a specification.

This invention relates to the care of live stock, and more particularly to that class thereunder known as "feed-troughs."

An object of the invention is to produce a device of the character wherein the trough will be so divided into a plurality of sections that one animal in feeding will in no wise crowd or interfere with another animal.

Another object of the invention is to so construct the trough that the animal is in no danger of being caught, and thereby endangering his life or in any way impairing or destroying the trough.

A still further object of the invention is to provide a device of this character whereby the feed may be distributed without interfering in any way with any animals that may be eating.

Furthermore, an object of the invention is to produce a device of this character that will be simple in construction, efficient in practice, and economical to manufacture.

With the above and other objects in view the invention consists in the details of construction and in the arrangement and combination of parts to be hereinafter more fully set forth and specifically claimed.

In describing the invention in detail reference will be had to the accompanying drawings, forming part of this specification, wherein like characters denote corresponding parts throughout the several views, in which—

Figure 1 is a view in perspective of the invention. Fig. 2 is a transverse section of Fig. 1. Figs. 3, 4, and 5 are views illustrating the details of construction.

In the drawings, A denotes the bottom of the trough, B the sides thereof arranged on an incline, and C the ends, all connected together in any preferred or ordinary manner. Extending upwardly from and longitudinally of the center of the bottom is a dividing board or wall D, secured at its ends to the ends C of the trough. This board or wall D extends a suitable distance above the ends C of the trough.

Attached centrally of each end C is an upright F, which extends above the top of said sides C and above the wall D. This upright is provided with the diagonal braces or supports *f*, which hold said upright against any accidental displacement.

Interposed between the standards F and having their ends pivoted thereto by the bolts *h* are the inclined walls E E, having their lower edges terminating at the sides of the wall D. These lower edges do not contact with the wall D, but are suitably spaced therefrom, thereby forming a passage-way on either side of said wall for the passage of any feed that may be put between the sides E, which form a hopper.

Secured at one end to the walls E of the hopper are a plurality of strips G, said bars being adapted to rest or bear near the opposite end on the upper edge of the sides B. Bars I are secured to the under surface of the strip G and hold them suitably spaced. It is found preferable to have these bars I bear against the edge of the sides B. These strips G divide the trough into a series of individual sections, and if in any way the animal should be caught by the strips or get into the trough it will be easy for him to lift the strips and make his escape.

This trough is intended mainly for hogs and may be used as a feed or water trough.

The construction, operation, and advantages will, it is thought, be understood from the foregoing description, it being noted that various changes may be made in the proportions and details of construction for successfully carrying the invention into practice without departing from the scope thereof.

Having fully described my invention, what I claim as new, and desire to secure by Letters Patent, is—

In a device of the character described, a trough, standards secured to the ends of the trough, a hopper, said hopper comprising walls pivotally secured to the standards, a partition for the trough extending between the lower edges of the walls of the hopper, said walls being normally in close proximity to but not in contact with the partition, cross-bars adapted to bear against the trough, and strips secured at one end to the lower edges of the walls and near their opposite ends to the cross-bars to hold the walls in their normal position.

In testimony whereof I have signed my name to this specification in the presence of two subscribing witnesses.

JESSE HUNT LYON.

Witnesses:
JAMES FABRICIUS KEITH,
EMMETT SENTINY STEWART.